United States Patent [19]

Roff, Jr.

[11] Patent Number: 5,593,582

[45] Date of Patent: Jan. 14, 1997

[54] TWO FOR ONE SHALE SHAKER

[76] Inventor: John W. Roff, Jr., P.O. Box 881, Conroe, Tex. 77305

[21] Appl. No.: 392,054

[22] Filed: Feb. 22, 1995

Related U.S. Application Data

[63] Continuation-in-part of Ser. No. 198,030, Feb. 17, 1994, Pat. No. 5,382,091, which is a continuation-in-part of Ser. No. 49,124, Apr. 19, 1993, Pat. No. 5,454,957.

[51] Int. Cl.$^6$ .................................................. B01D 33/03
[52] U.S. Cl. .................... 210/325; 210/335; 210/340; 209/250
[58] Field of Search .................................. 209/250, 243, 209/247, 254, 268, 269, 252, 498, 311, 315, 355, 906; 137/561, 883, 886, 875; 210/330, 340, 325, 335, 339, 484; 175/206; 406/154, 155, 156, 180, 181, 183

[56] References Cited

U.S. PATENT DOCUMENTS

| | | | |
|---|---|---|---|
| 2,260,095 | 10/1941 | Stevens | 209/355 |
| 2,716,493 | 8/1955 | Hutchison | 210/196 |
| 3,988,243 | 10/1976 | Huff | 210/389 |
| 4,234,416 | 11/1980 | Lower et al. | 209/315 |
| 4,376,042 | 3/1983 | Brown | 209/234 |
| 4,639,258 | 1/1987 | Schellstede et al. | 210/400 |
| 4,911,834 | 3/1990 | Murphy | 210/384 |
| 4,940,535 | 7/1990 | Fisher et al. | 209/250 |

*Primary Examiner*—W. L. Walker
*Attorney, Agent, or Firm*—David M. Ostfeld

[57] ABSTRACT

A shale shaker having two feeds, two screens, two mud outlets and a removable tray between the screens is disclosed. Each screen receives one feed and produces one outlet of cuttings and another outlet for separated mud for either bypass or direct feed to the mud tank or the other screen. The removable tray or trays facilitate the two screens acting in cascade. Valves are provided to control the overall flow rate to the shaker and to the lower level screen.

6 Claims, 7 Drawing Sheets

5,593,582

TWO FOR ONE SHALE SHAKER

CROSS-REFERENCED TO RELATED APPLICATIONS

This application is a continuation-in-part of U.S. application Ser. No. 08/198,030, filed Feb. 17, 1994, for Barite Scrubber Mud Tank, now U.S. Pat. No. 5,382,091, and is also a continuation-in-part of U.S. Ser. No. 08/049,124, filed Apr. 19, 1993, for Closed Loop System, now U.S. Pat. No. 5,454,957.

FIELD OF THE INVENTION

This invention relates to drilling mud processing and more particularly to cutting extraction from drilling muds.

BACKGROUND OF THE INVENTION

In the drilling of oil wells, the use of mud in the operations of the drilling have been known for many years. The return of this mud from the hole where the drilling occurs includes cuttings and other materials that are not or were not part of the mud. In mud drilling operation, cuttings and other materials become entrained in the mud and must be removed.

It is an object of the present invention to have a faster separation of cuttings and other materials from the mud, the gas, water and materials produced by the well in a shaker unit so that the cuttings and other materials are separated from the other components produced or used in the drilling process and are not otherwise dumped into the environment or recirculated to the well, while maintaining the capacity for a more thorough separation if desired.

SUMMARY OF THE INVENTION

A shale shaker is disclosed in which are located two feeds, two screens, each screen receiving one feed, and two outlets, each screen producing one outlet of cuttings and another outlet for separated mud for either by pass or direct feed to the mud tank or the other screen. The shale shaker also has removable trays to facilitate the two screens acting in cascade. By either the tandem or cascade use of the shaker, space on the drilling rig is saved. Valves are provided to control the overall flow rate to the shaker and to the lower level screen.

DESCRIPTION OF THE DRAWINGS

For a further understanding of the nature and objects of the present invention, reference should be had to the following drawing in which like parts are given like reference numerals and wherein.

DESCRIPTION OF THE PREFERRED EMBODIMENT

Figure 1:
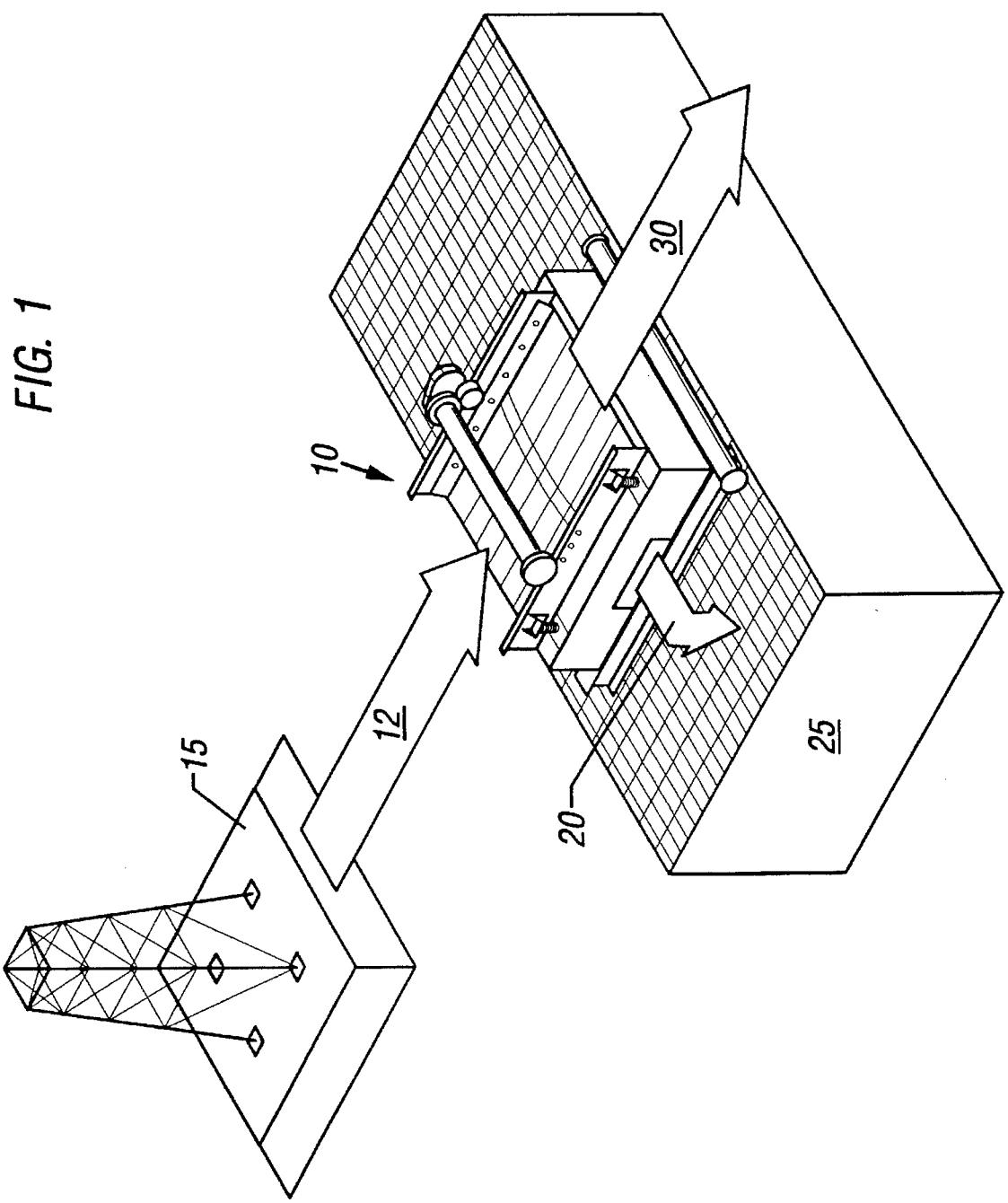
FIG. 1 is a prospective view of a shaker system of the prior art.

As shown in FIG. 1, a shale shaker 10 receives mud 12 from the drilling rig 15. The mud effluent 20 flows from the shale shaker to the active mud tank 25 as in well known in the art. The solids (cuttings) 30 are separated from the mud effluent 25 and discharge to waste as is also well known in the art. In the prior art there have been various levels of screens used in a shale shaker with a common discharge for the effluent. Each succeeding lower screen receives mud effluent which has passed through the screen above, etc.

Figure 2:
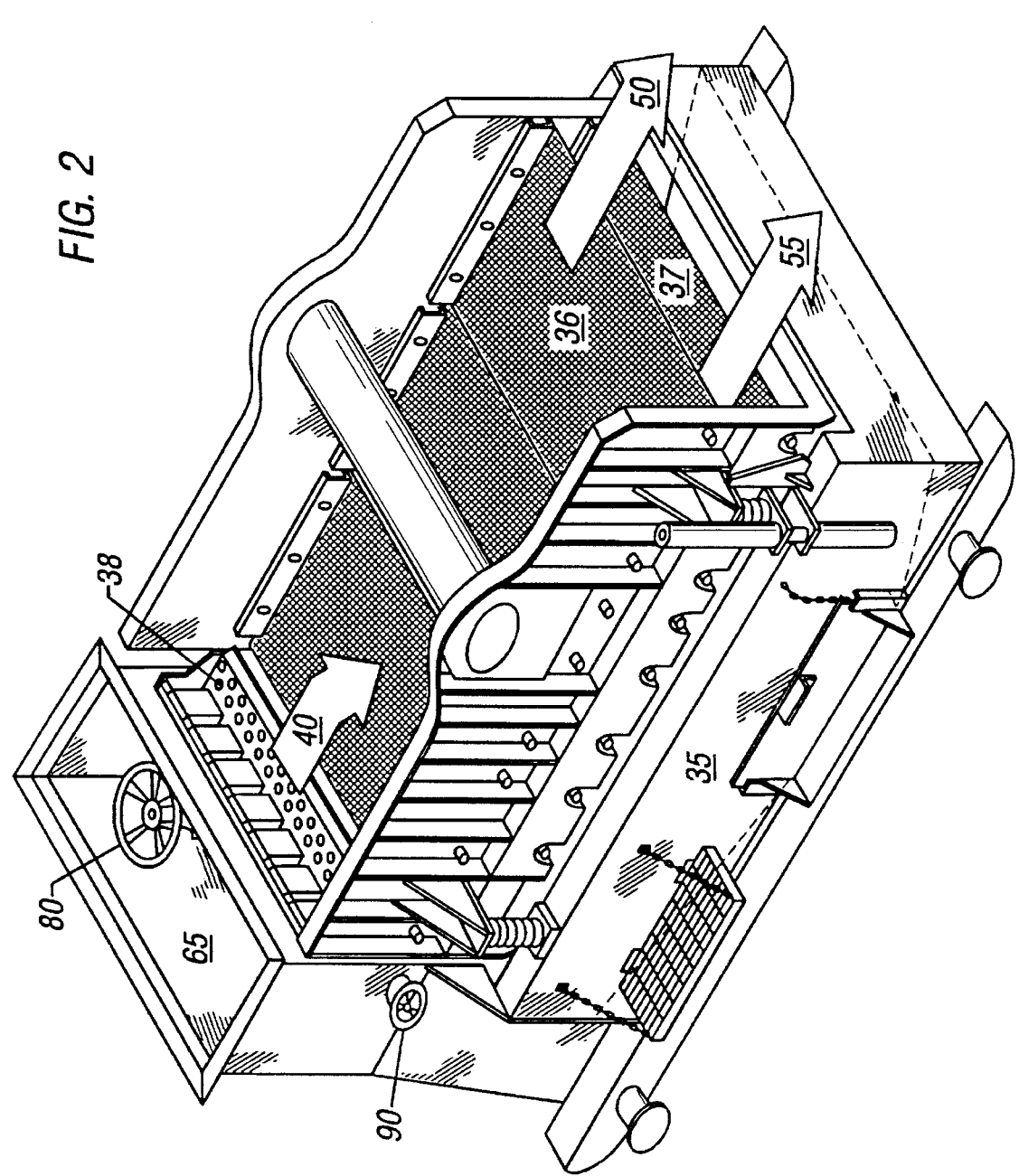
FIG. 2 is a prospective view of the two for one shale shaker of the preferred embodiment of the present invention, partly in phantom line.
Figure 3:
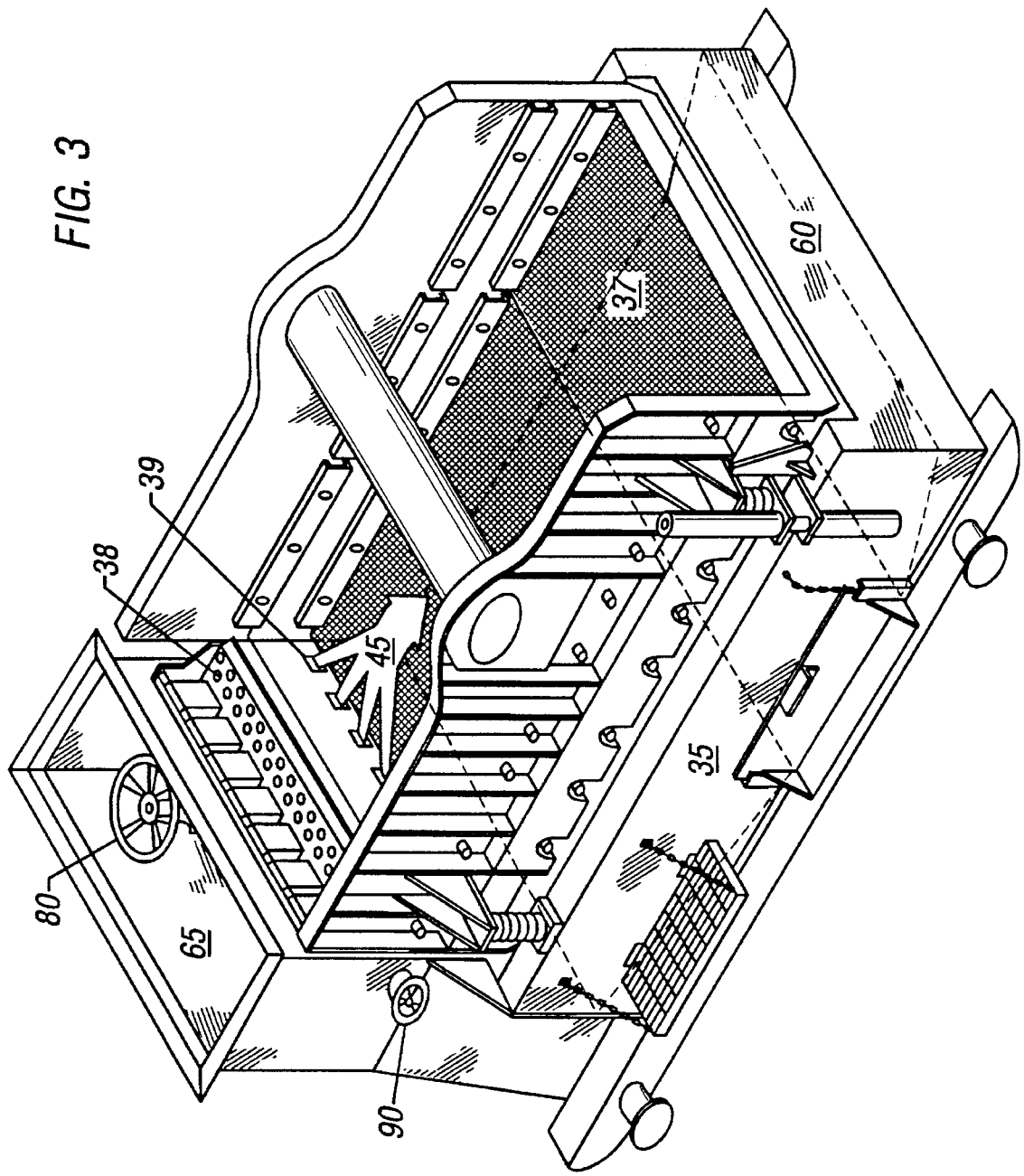
FIG. 3 is a prospective view of the two for one shale shaker of the preferred embodiment of the present invention, partly in phantom line.
Figure 4:
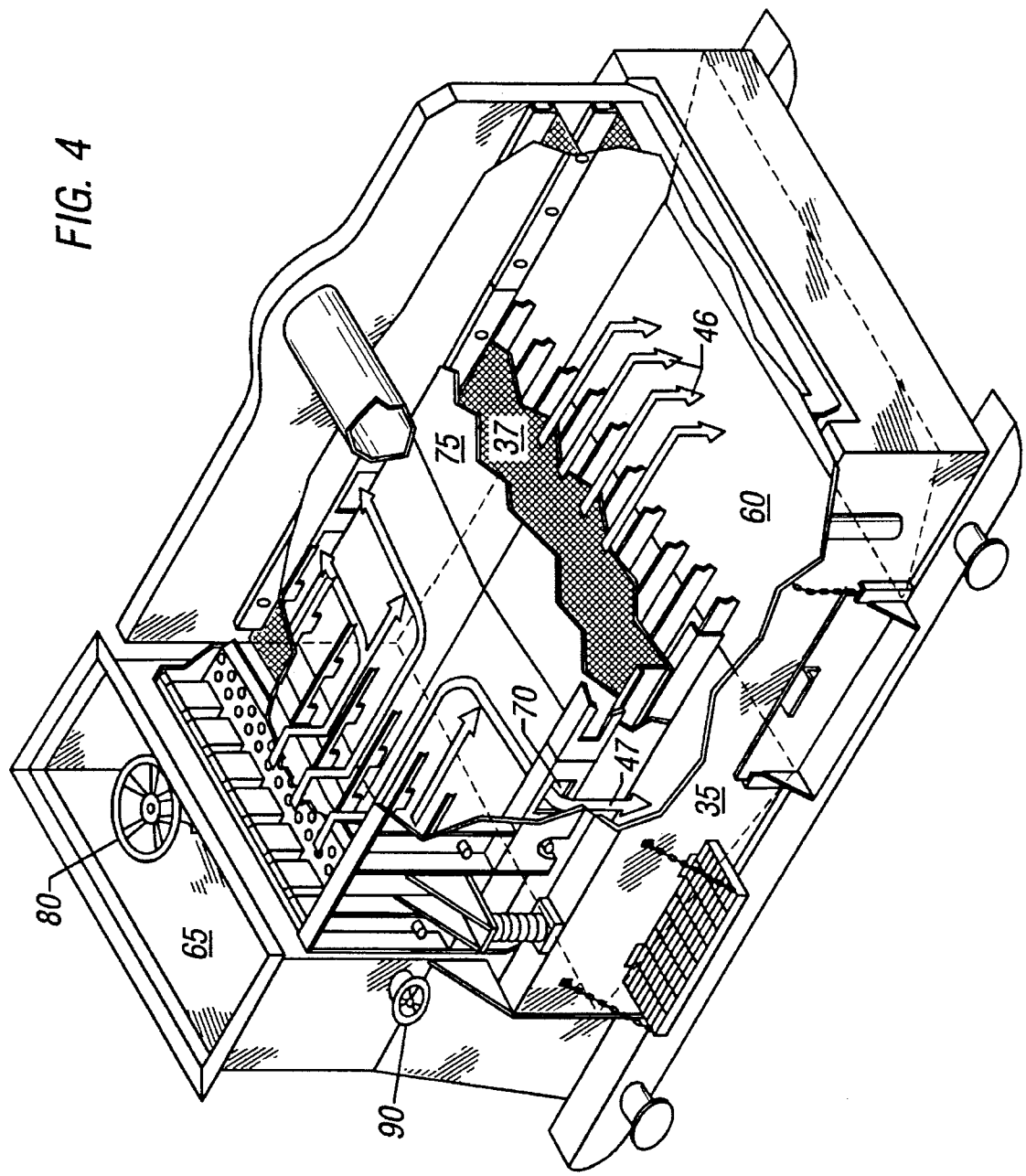
FIG. 4 is a prospective view of the two for one shale shaker of the preferred embodiment of the present invention, partly in phantom line and cutout, showing mud affluent flow.

In the present invention a shaker 35 includes two parallel, juxtaposed screens 36, 37, separated by removable trays 75 located in parallel with and juxtaposed with screens 36, 37. Openings or bypass 70 are formed in the sides of shaker 35 between screen 36 and trays 75. Shaker 35 further includes a first feed inlet 38 and a second feed inlet 39 (FIGS. 2 and 3). Shaker 35 also includes a mud tank 60 below screen 37 (FIG. 4) and an inlet hopper or box 65 (FIG. 7) positioned on the upstream side of feed inlets 38, 39. Mud 12 is received from the drilling rig 15 through inlet hopper or box 65 at the two separate levels, Level 1, FIG. 2, from feed inlet 38 which flows 40 onto screen 36 and Level 2, FIG. 3 from inlet 39 which flows 45 onto screen 37. Waste (cuttings) are also discharged at two separate levels 50, 55 from screens 36, 37, respectively, as shown in FIG. 2. The effluent 47 from the upper screen 36 is discharged directly to a mud tank 60, as shown in FIG. 4, thus bypassing the lower screen 37, and the effluent 46 from the lower screen 37 is discharged directly to mud tank 60, as shown in FIG. 4. This greatly increases the volume which can be processed by one shale shaker 35. The results are two shale shakers in one location, thus the name "Two For One Shale Shaker".

Figure 7:
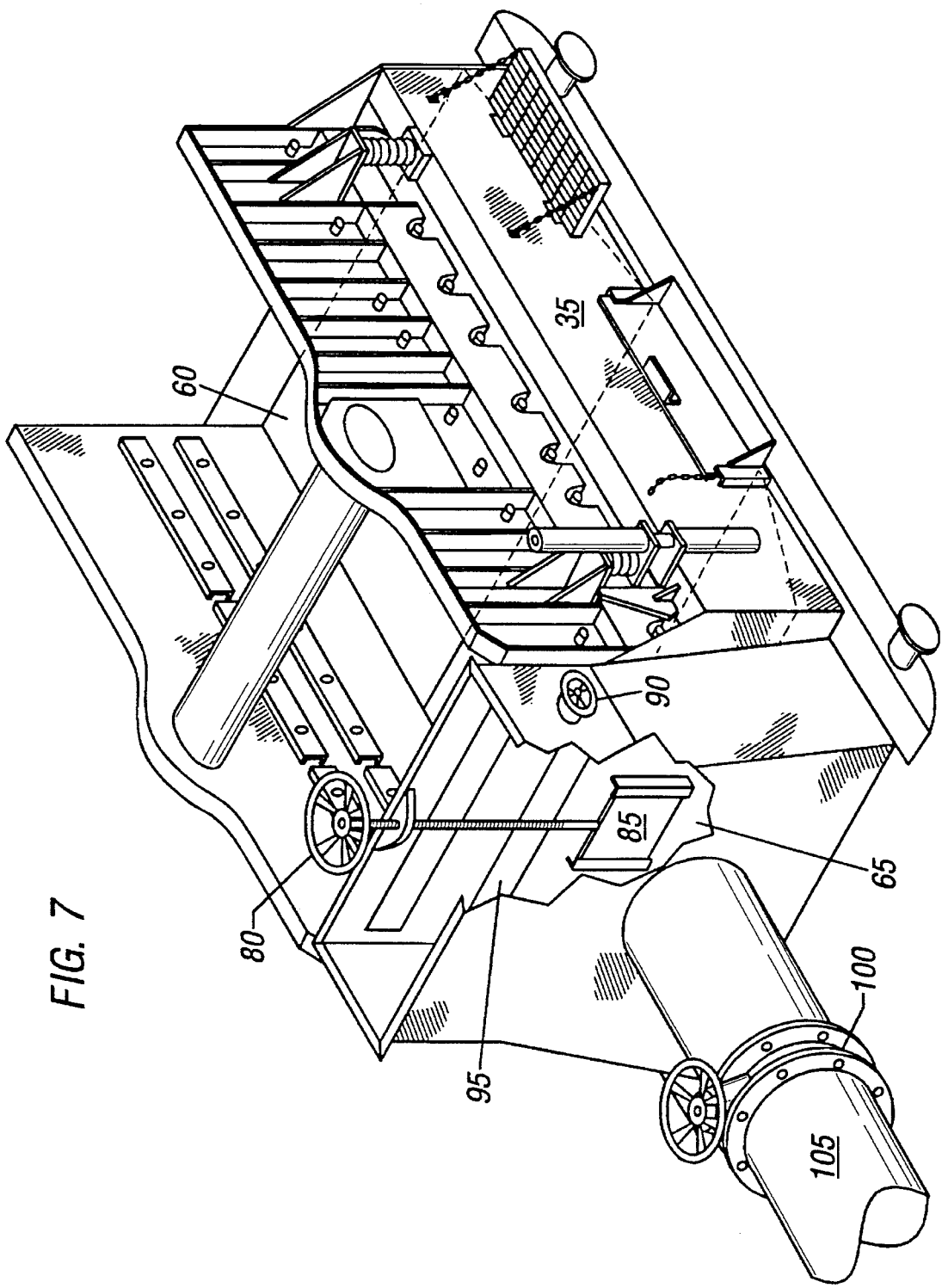
FIG. 7 is a prospective partial view of the two for one shale shaker of the preferred embodiment of the present invention, showing the control system.

As shown in FIGS. 1, 2, 4, and 5, the mud flows from the drilling rig 15 via pipe 105 to the two for one shale shaker 35 mud hopper or box 65 (FIG. 7). From the mud hopper 65 the mud flows through the two separate openings or feed inlets 38, 39. The effluent 40 of feed inlet 38 flows from the upper screen level 36 and discharges the mud 47 onto trays 75 and through bypass 70 to mud tank 60. The cuttings 50 from upper level screens 36 are discharged to waste (not shown). See FIG. 2. The effluent 45 of feed inlet 39 enters at lower level screen 37 and discharges the mud 46 (FIG. 4) through screen 39 directly into mud tank 60. The cuttings discharge from lower level screens 37 to waste (not shown). See FIG. 2.

Figure 5:
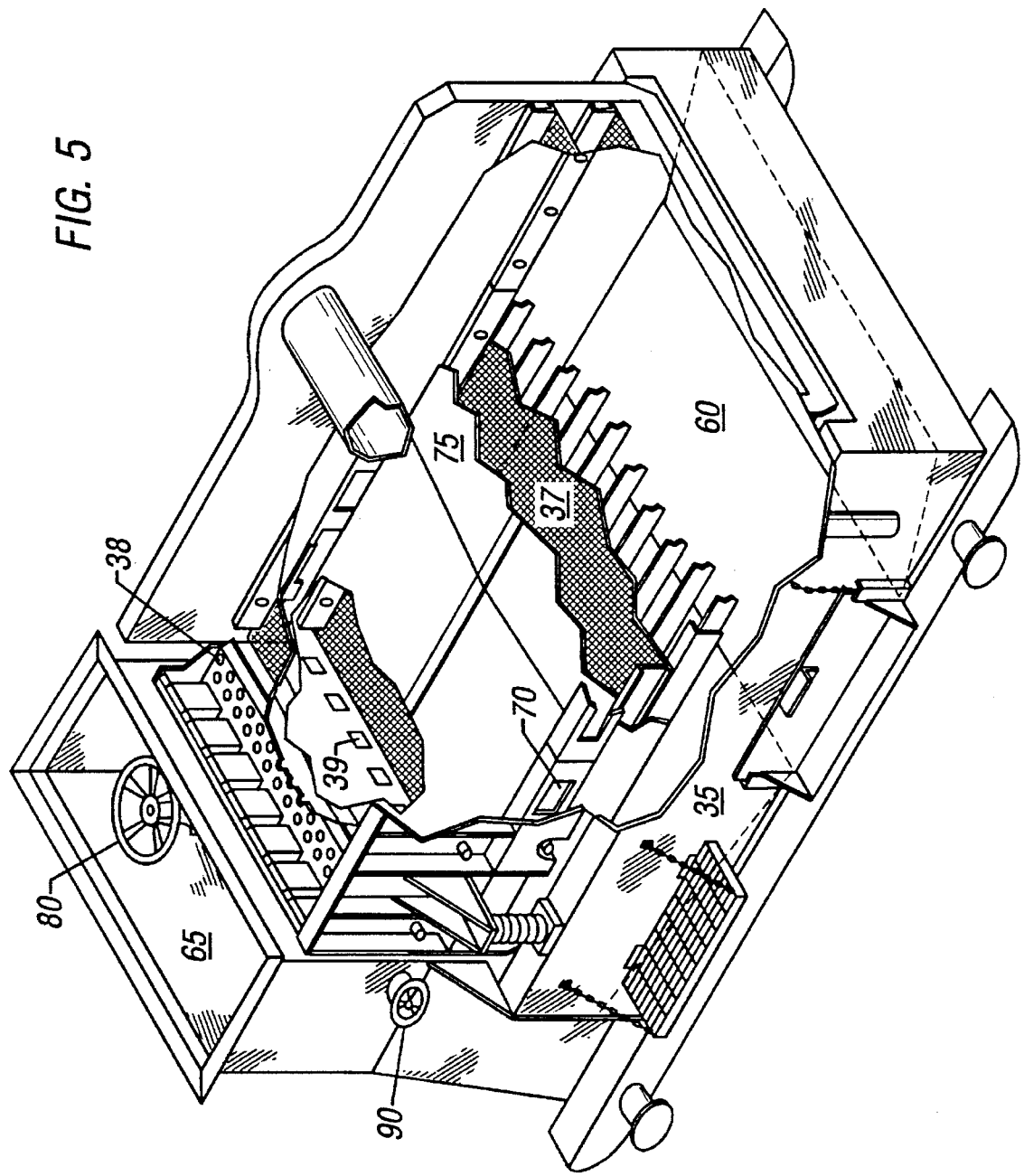
FIG. 5 is a prospective view of the two for one shale shaker of the preferred embodiment of the present invention, partly in phantom line and partly in cutout.

In the prior art for cascade, the mud flows from the drilling rig 15 to the primary shakers 10 which will use sixty to eighty mesh screens and then pump the mud to secondary shakers (not shown) which will utilize smaller mesh screens. The two for one shale shaker 35 has removable discharge trays 75 located at the upper screen 36 level which are shown in FIG. 5 which facilitate the flow 47 effluent 40 from the upper screen level 36 through the bypass 70. With these trays 75 removed, and with bypass 70 usually closed, and installing an eighty mesh screen on the upper screen level 36 and a one hundred and fifty mesh screen on the lower level screen 37, the two for one shale shaker 35 becomes a cascading type shale shaker which accomplishes the work of two separate shale shakers to produce finer screening. This advantage becomes very important when considering the fact that all the drilling mud can be processed before entering any of the centrifical pumps old in the art which tend to crash the cuttings into smaller pieces thus making separation more difficult.

Figure 6:
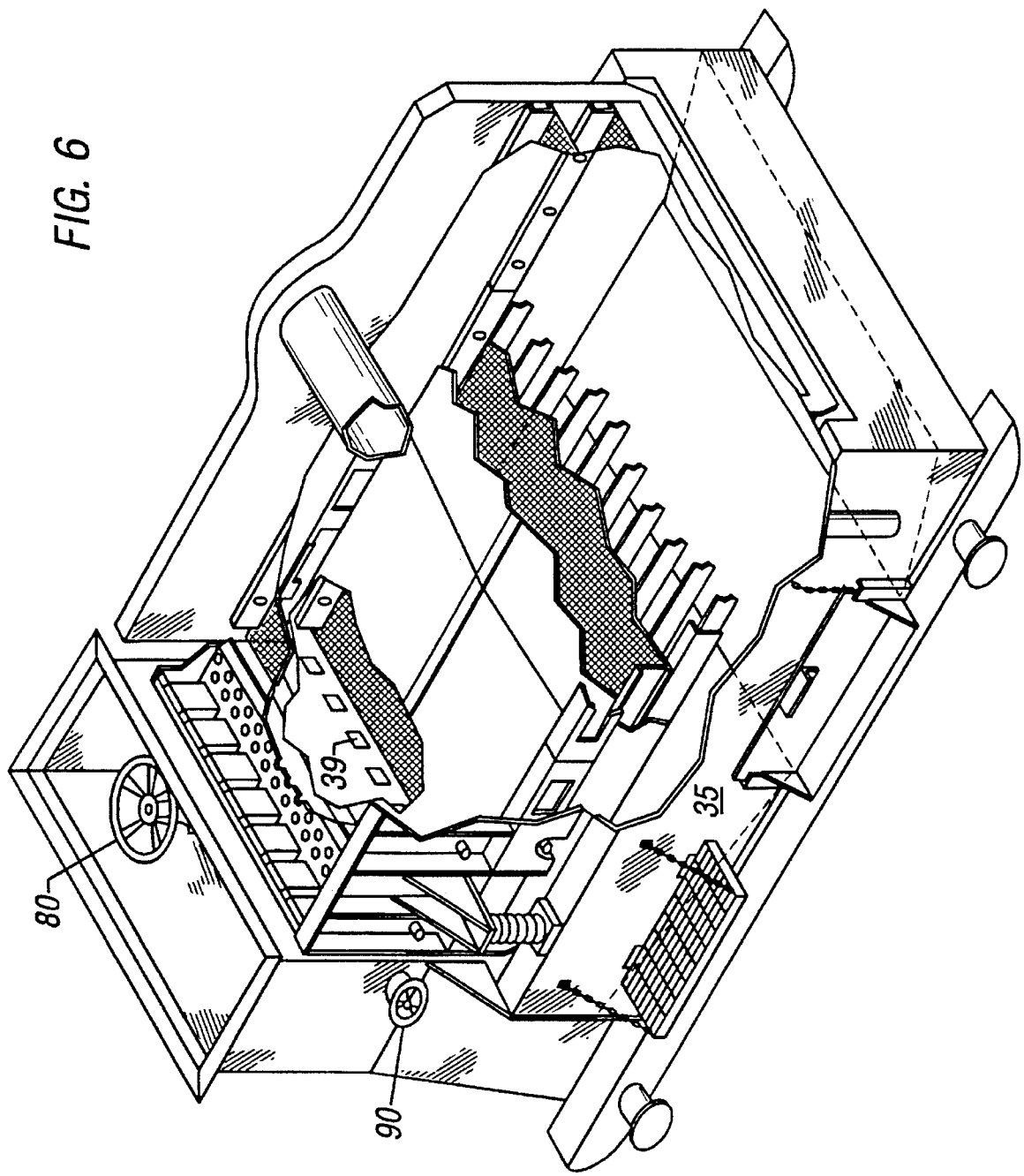
FIG. 6 is a prospective view of the two for one shale shaker of the preferred embodiment of the present invention, partly in phantom line and partly in cutout.

The shaker 35 also includes flow control mechanisms to properly route and set flow rates at the inlets 38, 39, as best seen in FIGS. 6 and 7. The control wheel 80 (FIG. 6) controls a bypass door 85 (FIG. 7) at the bottom of the mud box or hopper 65. This door 85 is closed while the shale shake 35 is in normal operation. The door 85 is opened when it is necessary to bypass the shale shaker 35.

A control wheel 90 (FIG. 6) is also provided to adjust the volume of mud that enters the lower level 95 (FIG. 6) to inlets 39. A maintenance valve 100 is provided in inlet pipe 105. Inlet pipe 105 connects shale shaker 35 with the rig 15. Valve 100 sets all flow to the mud box 65. The sequence of operation is to control the lower level mud volume 45 with the control wheel 90 (FIG. 6), and then adjust the main entrance valve 100 (FIG. 7) to the shale shaker in order to control the upper level 40 mud volume.

The embodiment set forth herein is merely illustrative and does limit the scope of the invention or the details therein. It will be appreciated that many other modifications and improvements to the disclosure herein may be made without departing from the scope of the invention or the inventive concepts herein disclosed. Because many varying and different embodiments may be made within the scope of the inventive concept herein taught, including equivalent structures or materials hereafter thought of, and because many modifications may be made and the embodiments herein detailed in accordance with the descriptive requirements of the law, it is to be understood that the details herein are to be interpreted as illustrative and not in a limiting sense.

What is claimed as invention is:

1. A shale shaker, comprising:

a mud box;

a first feed inlet;

a first screen positioned below said first feed inlet and having two sides;

a second feed inlet;

a second screen positioned below said second feed inlet and said first screen;

said first feed inlet and said second feed inlet in fluid communication with said mud box;

a mud tank located below said second screen; and a bypass mechanism in fluid communication with the side of said first screen opposite the side facing said first feed inlet, said bypass mechanism in fluid communication with said mud tank.

2. The shale shaker of claim 1, wherein said bypass mechanism includes a tray and bypass openings, said tray positioned below said bypass openings.

3. The shale shaker of claim 2, wherein said tray is removable.

4. The shale shaker of claim 1, wherein there is included a mechanism to regulate the flow through said second feed inlet.

5. The shale shaker of claim 4, wherein there is further included a second mechanism to regulate the flow through said first feed inlet and said second feed inlet.

6. The shale shaker of claim 1, wherein there is further included a first waste discharge from said first screen and a second waste discharge from said second screen.

\* \* \* \* \*